US010894343B2

(12) United States Patent
Pero, III

(10) Patent No.: US 10,894,343 B2
(45) Date of Patent: Jan. 19, 2021

(54) SYSTEM FOR MANUFACTURE OF LOW DENSITY SHEETS RIGIDIZED WITH NYLON FIBERS

(71) Applicant: Michael A. Pero, III, Wood Ridge, NJ (US)

(72) Inventor: Michael A. Pero, III, Wood Ridge, NJ (US)

(*) Notice: Subject to any disclaimer, the term of this patent is extended or adjusted under 35 U.S.C. 154(b) by 34 days.

(21) Appl. No.: 16/235,998

(22) Filed: Dec. 28, 2018

(65) Prior Publication Data

US 2020/0206985 A1 Jul. 2, 2020

(51) Int. Cl.
| | |
|---|---|
| B29C 43/00 | (2006.01) |
| B29C 43/52 | (2006.01) |
| B29C 65/48 | (2006.01) |
| D04H 1/4342 | (2012.01) |
| B29K 105/00 | (2006.01) |
| D04H 1/587 | (2012.01) |
| D04H 1/64 | (2012.01) |
| B29K 77/00 | (2006.01) |
| B29K 105/04 | (2006.01) |
| B29K 105/12 | (2006.01) |
| D04H 1/4391 | (2012.01) |

(52) U.S. Cl.
CPC .......... *B29C 43/003* (2013.01); *B29C 43/006* (2013.01); *B29C 43/52* (2013.01); *B29C 65/4835* (2013.01); *B29K 2077/00* (2013.01); *B29K 2105/0097* (2013.01); *B29K 2105/04* (2013.01); *B29K 2105/128* (2013.01); *D04H 1/4342* (2013.01); *D04H 1/4391* (2013.01); *D04H 1/587* (2013.01); *D04H 1/64* (2013.01)

(58) Field of Classification Search
CPC combination set(s) only.
See application file for complete search history.

(56) References Cited

U.S. PATENT DOCUMENTS

| | | | |
|---|---|---|---|
| 3,052,646 | A | 9/1962 | Doggett et al. |
| 3,382,185 | A | 5/1968 | Wheeler et al. |
| 3,427,179 | A | 2/1969 | Davis et al. |
| 3,489,631 | A | 1/1970 | Chen et al. |
| 5,430,068 | A | 7/1995 | Subramanian |
| 8,058,343 | B2 | 11/2011 | Liu et al. |
| 2007/0213457 | A1* | 9/2007 | Liu .................... C08G 18/0823 524/591 |

OTHER PUBLICATIONS

Article—Polymer, vol. 19, No. 1, p. 77 to 80—1978 by Kapko, et al.

* cited by examiner

*Primary Examiner* — Vishal I Patel
(74) *Attorney, Agent, or Firm* — Ernest D. Buff & Associates, LLC; Ernest D. Stiff; Dave Narasimhan

(57) ABSTRACT

A rigid nylon porous material sheet is produced by the adhesive bonding of kinked nylon fibers having lengths of 1 to 5 inches. These fibers are cut from melt spun nylon or harvested from clean carpet fibers by shearing. The adhesive used is glycol, which attacks nylon at 180° C. forming a gel on the surface of the kinked fibers, but does not attack the nylon fibers when the kinked fiber assembly is cooled to 150° C. to precipitate ultrafine nylon within the gel. The fiber assembly is heated to 160° C. to bond the nylon fibers. It is then washed in hot water to remove unused glycol. The other adhesive is polyurethane, which is applied to the kinked fibers using coupling agents of aqueous resorcinol and vinyl pyrrolidone.

9 Claims, 3 Drawing Sheets

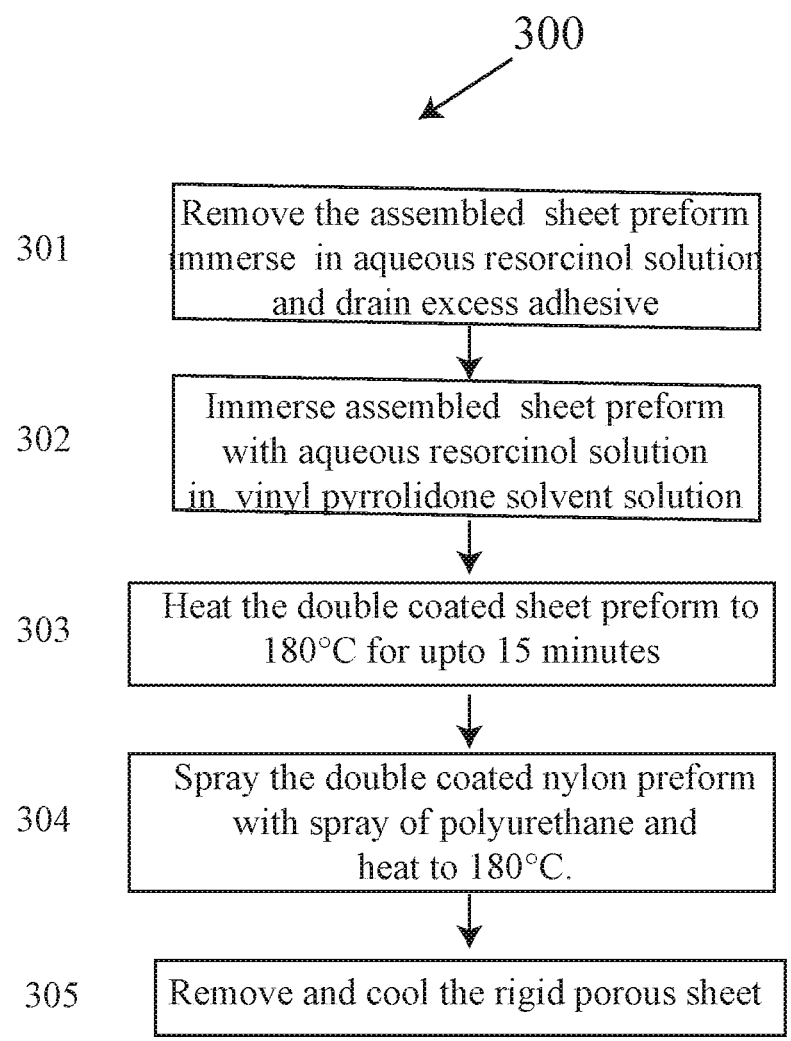

SYSTEM FOR MANUFACTURE OF LOW DENSITY SHEETS RIGIDIZED WITH NYLON FIBERS

1. FIELD OF THE INVENTION

The present invention relates to manufacture of building materials, such as wallboard, tile, shingles and the like; and more particularly to a system which produces plain or decorative low-density high strength high modulus rigid sheet by a high-temperature high-pressure molding process for forming nylon polymer fibers incorporating adhesives.

2. DESCRIPTION OF THE PRIOR ART

A present, decorative boards are available in the market, for example, wooden board, particleboard, density board, fiber composite board. Wooden board, particleboard, density board, and fiber composite board exhibit very low anti-flaming and fire resistant performance. Wooden boards are not waterproof or moisture proof and, consequently, enjoy somewhat limited application. Fireproof board is generally a sandwich board with 3 layers. Metal boards (aluminum boards, stainless steel boards, colored iron boards, titanium zinc boards, titanium boards, copper boards, etc.) comprise the metallic surface and bottom layers, and halogen-free, anti-flaming inorganic composition comprising the middle layer. This hot-pressed composite board exhibits good anti-flaming and fire resistant performance, but it is heavy, expensive, and is not waterproof.

Numerous prior art patents and disclosures relate to the formation of sheet material from nylon fibers. Specifically, these polymeric foams are not infiltrated with polymers to produce rigid decorative sheets for use in structural or decorative building materials and other applications.

U.S. Pat. No. 3,052,646 to Doggett et al. discloses blending finely divided polyamide and polyethylene glycol. The granulated synthetic linear polyamides are molded with or without a filler, and with the aid of mold lubricant.

U.S. Pat. No. 3,382,185 to Wheeler et al. discloses a nylon solvent and method of making the same. This solvent is prepared by reacting a dimethylmetadioane with formaldehyde. This nylon solvent is not indicated to bond nylon fibers to form a bonded nylon sheet.

U.S. Pat. No. 3,427,179 to Davis et al. discloses a method of making porous polyimide fabric. Micro-porous polyimide product, for example, leather or like fabric substitute is disclosed, together with a method for manufacturing same. Product is formed by dissolving polyimide in liquid which is non solvent at room temperature and solvent at elevated temperature, applying the solution to a base, cooling the solution of polyimide liquid solvent to a temperature below which the liquid is a solvent for polyimide thereby forming a stable gel and liquid extraction at a temperature at which the liquid is a non-solvent. The solvent is glycol, and the extraction is carried out using water. The gel is melted at a high temperature, and the melt is distributed over the fiber form, which solidifies to form a bond. The object formed is a fabric, not a rigid sheet.

U.S. Pat. No. 3,489,631 to Chen et al. discloses a method for bonding polyurethane to plastic material. A method of bonding polyurethane to plastics, for example, polyamides, and a hose comprised of polyamide inner tubing, a braided jacket, and a polyurethane outer sheath are disclosed. The method involves the steps of (i) applying a solvent for the polyamide, (ii) applying a solvent for the polyurethane and (iii) extruding the polyurethane jacket on a sheath. The solvent for the polyamide is resorcinol, and the solvent for the polyurethane is vinyl pyrrolidone.

U.S. Pat. No. 5,430,068 to Subramanian discloses recovery of polyamide using a solution process. The polyimide dissolving solution is a solvent selected from the group consisting of a substantially anhydrous ethylene glycol, propylene glycol, and aliphatic carboxylic acid having from 2 to 6 carbon atoms. The solvent is heated to 180° C., and the dissolved solution is cooled to 100° C. to precipitate dissolved nylon. This solvent is not used to bond nylon fibers.

U.S. Pat. No. 8,058,343 to Liu et al. discloses a solvent-free aqueous polyurethane dispersion and adhesive films therefrom for stretch fabrics. The aqueous polyurethane dispersions are provided in solvent-free systems of a prepolymer comprising at least one polyether or polyester polyol, a mixture of MDI isomers, and a diol. The adhesive films from such dispersions can be heat-activated for bonding, lamination, and adhesion of textile fabrics, including stretch fabrics. The aqueous polyurethane dispersion comprises a prepolymer, which comprises: a) at least one polyether or polyester polyol, wherein said polyether or polyester polyol has a number average molecular weight of about 600 to about 3,500; b) a mixture of 4,4'- and 2,4'-methylene bis(phenyl isocyanate) (MDI) isomers, wherein the ratio of 4,4'-MDI to 2,4'-MDI isomers ranges from about 65:35 to about 35:65; and c) at least one diol compound comprising: (i) hydroxy groups capable of reacting with the mixture of MDI isomers of component b) and (ii) at least one carboxylic acid group capable of forming a salt upon neutralization, wherein said at least one carboxylic acid group is incapable of reacting with the mixture of MDI isomers of component b); wherein the aqueous polyurethane dispersion is a substantially solvent-free system that further comprises: d) at least one neutralizing agent to form an ionic salt with the at least one diol compound; and e) at least one monofunctional dialkyl amine compound as a blocking agent for isocyanate groups; and further comprising at least one surface active agent; at least one antifoam agent at least one rheological modifier; at least one diamine chain extension component, and at least one polymeric component selected from the group consisting of polyethylenimine dendrimers, poly(vinylamine) dendrimers, poly(allylamine) dendrimers, and poly(amidoamine) dendrimers, with at least three or more primary and/or secondary amino groups per mole of the polymer. As shown in example 18, the laminated stretch article 18a was covered with another 12-inch×12 inches (30 cm×30 cm) piece of warp knit nylon spandex fabric. The fabric/film/fabric sandwich is fed into the Hashima laminator and laminated at 165° C., with a 20 second residence time and a pressure setting of P=1, to give stretch article 24a. The peel strength for Example 18 was 2.56 lb/in, see Table 2.

The article in Polymer, volume 19, number 1 pages 77 to 80 1978 by Kapko et al., details degradation of nylon-6 by ethylene glycol. Glycolysis of nylon-6 in boiling ethylene glycol was studied. Oligoamides with amino- and hydroxyl end-groups were obtained. The following catalysts were examined: zinc acetate, sodium glycolate and poly(phosphoric acid). The reaction rate constants found for first-order reaction proved that the amino-groups formed during the degradation take part in acceleration or slowing of the reaction velocity. The reaction rate constants did not change in the polymerization degree range of P=159-20. Beginning from the polymerization degree P=20 in case of zinc acetate, sodium glycolate and without the catalyst the reaction rate constants increased, the reverse effect was observed when poly(phosphoric acid) was used.

Based on the foregoing, there exists a need in the art for an easy to use method for manufacturing building materials in the form of plain or decorative rigid structural nylon sheets that exhibit flame resistance, enhanced insulation and mold-free properties.

SUMMARY OF THE INVENTION

The present invention provides a rigid sheet of bonded nylon fibers, the sheets having low density especially well suited for, but not limited to, building construction. These sheets have a density ranging from 0.12 to 0.66 grams/cc, which is about which 30% to 60% of solid nylon sheet, which has a typical density of 1.14 grams/cc for nylon 6 and 1.1314 grams/cc for nylon 66. The polymer is melted and spun using spinnerets. Nylon 6 melts at a temperature of 215° C. while nylon 66 melts at a temperature of 264° C.

These fibers can be cut to desired lengths from fresh nylon spun fibers from a spinneret. These cut fibers are typically 1 to 5 cm in length. On the other hand nylon fibers may be harvested from used washed nylon carpets or other recycled nylon-containing materials, such as textiles, articles of clothing, fabric and the like by a shearing machine. Nylon fibers harvested from used washed nylon carpets are typically 1 to 5 inches long depending upon the pile of the carpet. The cut nylon yarns are kinked when passed through a slotted rotating disk. The kinked fibers are assembled in a preform that has the length and width dimension of the desired nylon sheet by air laying. The amount or weight of chopped kinked nylon fibers delivered to the preform is calculated based on the thickness of the nylon sheet desired and the density of the kinked yarn. The sheet in the preform has loosely packed kinked fibers, and is substantially thicker. The fibers in the preform are compressed by the application of pressure using a plate, to reduce the thickness of loosely packed fibers to the desired sheet thickness. The resulting sheet has a desired sheet thickness and has desired density or the amount of porosity.

The sheet is then immersed in an adhesive solution. When the adhesive selected is a glycol composition, it is stable with no dissolution of nylon while it dissolves the outer layers of the nylon fiber when heated to about 180° C. to form a gel. When the sheet is cooled back to about 150° C., nylon fibers are no longer attacked by the glycol and precipitate in the gel as ultrafine particles of previously dissolved nylon. When the sheet is heated to about 160° C., the ultrafine particles bond readily due to their enhanced surface area. Since the fibers of nylon are closely spaced in the compressed sheet, the gels formed on the surface of adjacent fibers touch each other, and the precipitates of ultrafine nylon particles join together and create a bond between the fibers. The sintered sheet is now integral and can be washed with water at about 50° C. to 80° C. to leach out any free unreacted glycol.

Another adhesive may bond kinked fragments of nylon fibers. The assembled nylon fibers are first immersed in aqueous solution of resorcinol. Resorcinol is a solvent for nylon and attaches itself to the nylon fiber surface. Next, the air-laid nylon fibers with resorcinol coating are immersed in a solution of vinyl pyrrolidone solvent. Next, this double coated nylon fiber assembly is sprayed with polyurethane which swells over the vinyl pyrrolidone. The whole structure is then heated to 180° C., whereby the nylon fibers become permanently bonded to the polyurethane, creating a rigid sheet.

The resorcinol molecule has hydroxyl groups on each end. A hydroxyl group on one end readily attaches to the polyamide in a hydrogen association bond. The hydroxyl group at the other end of the resorcinol molecule may readily attach itself to polyurethane or to the vinyl pyrrolidone solvent, forming bonds that are hydrogen association bonds. The polyamide and polyurethane are thus bonded by a chain with two links, one being polyamine to resorcinol and the other being resorcinol to vinyl pyrrolidone.

The bonded nylon sheet formed in accordance with the subject invention has a very large number of closed microcells ranging in dimension from 10 to 70 micrometers. These sheets also have extremely small sized uniformly distributed closed cells of air pockets that enhance the thermal insulation properties as well as provide sound attenuation characteristics. This density of the sheets produced depends on the composition of the nylon fiber layup, mold fill quantity, and the pressure and temperature applied during the sheet formation.

Applications of the present invention also contemplate use in aeronautical technologies, including noise canceling aviation insulating systems. These systems comprise an insulation material, while also uniquely provides enhanced acoustic properties that minimize within the cabin sound emanating from the exterior of an aircraft. Owing to its physical properties, the subject material is ideal for use as an aircraft thermal/acoustic insulation material. Both thermal and acoustical insulation is required on passenger aircraft.

The material of the subject invention not only exhibits optimal thermal, acoustic and fire retardation properties, but further does not absorb large amounts of water and does not cause or promote corrosion to the aluminum fuselage structure of the aircraft. The material is not electrically conductive and does not interfere with inspection of the fuselage structure for corrosion, cracks, etc. In fact, the use of the material as a sheet provides an easier viewing of the fuselage than currently utilized plastic bagged fiberglass and other materials, while providing a cleaner, safer installation with environmentally sound properties.

In a preferred embodiment, the rigid nylon porous sheet of the present invention comprises:

1) Nylon fibers manufactured by melt spinning or harvested by shearing clean nylon carpet or other recycled nylon-containing materials, such as textiles, articles of clothing, rope, fabric and the like, the nylon fibers being chopped to 1 inch to 5 inches in length;

2) passing chopped nylon fibers through a slotted rotating disk to form kinks in the fibers;

3) creating a mold which has the same length and width as the desired nylon sheet size but with a mold height at least twice that of the thickness of the desired nylon sheet;

4) calculating the weight of the kinked fibers needed to fill the mold to produce the desired sheet thickness and sheet porosity;

5) filling the mold with the calculated weight of kinked fibers and compressing the filled mold by application of pressure by a plate to bring the thickness of the sheet to the desired value;

6) removing the adhesive treated assembled fiber sheet preform;

7) immersing the assembled fiber sheet preform in an adhesive solution and draining excessive adhesive;

8) heating said adhesive treated assembled fiber sheet preform to a temperature of 180° C. for a sufficient time period to cure the adhesive, thereby bonding the nylon fibers;

9) removing rigid porous nylon sheet and cooling the nylon sheet 10) the compacted nylon fibers in the mold having a density ranging from 10% to 60% of a solid nylon sheet with closed cells of air pockets present within the sheet;

11) said mold optionally having decorative markings that are transferred to the molded rigid porous nylon sheet;

whereby the rigid porous nylon sheet with closed air cells exhibits thermal resistance and sound attenuation properties that commend the sheets for use in building construction as well as decorative applications.

BRIEF DESCRIPTION OF THE DRAWING

The invention will be more fully understood and further advantages will become apparent when reference is had to the following detailed description of the preferred embodiments of the invention and the accompanying drawing, in which:

FIG. 3 illustrates use of polyurethane adhesive.

DETAILED DESCRIPTION OF THE INVENTION

Figure 1:
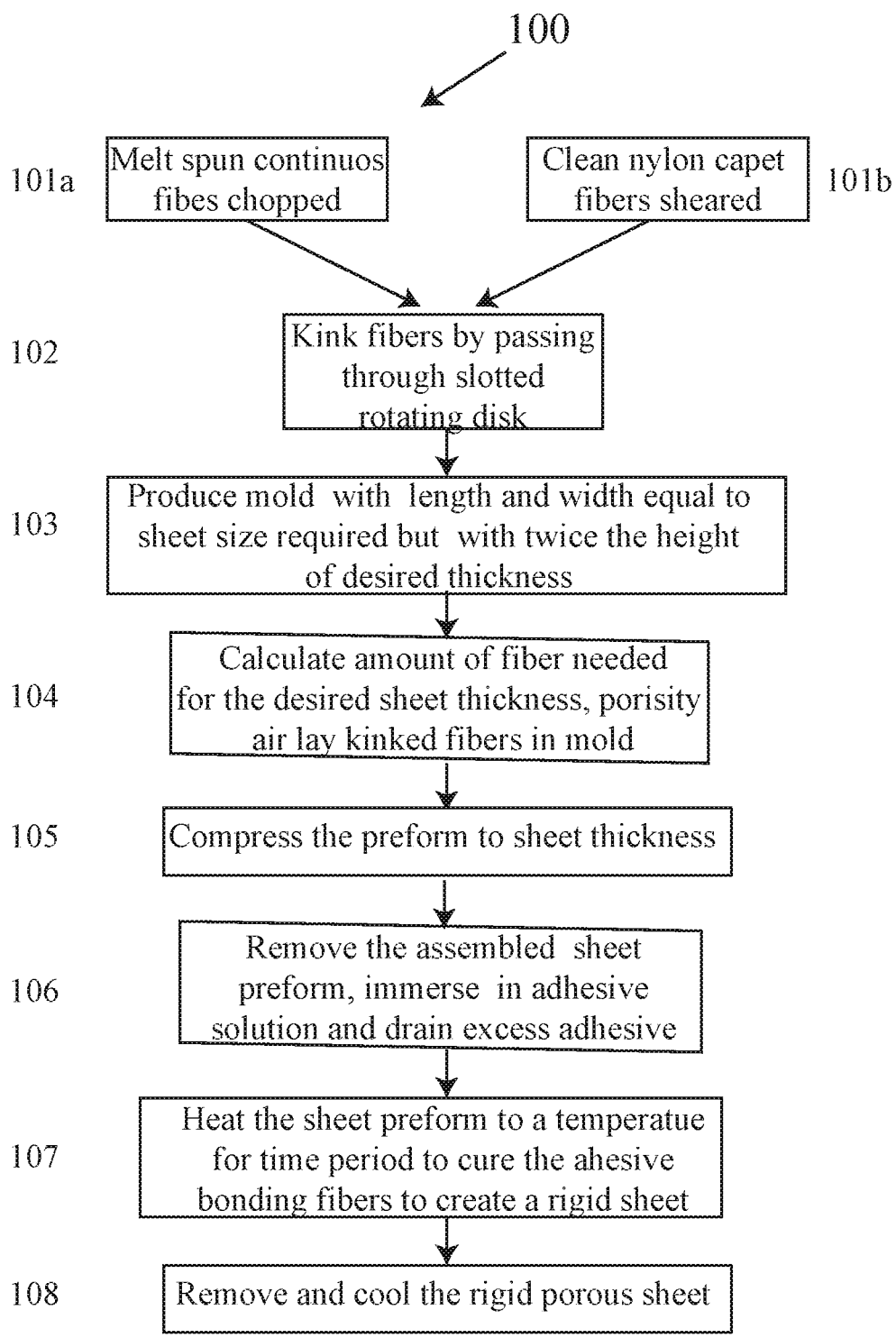
FIG. 1 illustrates the process steps in the manufacture of the rigid porous nylon sheet.

The present invention provides a rigid sheet of porous bonded nylon fibers, the sheets having low density especially well suited for, but not limited to, building construction. These sheets have a density ranging from 0.12 to 0.66 grams/cc, which is about which 10% to 60% of solid flexible nylon, which has a typical density of 1.14 grams/cc for nylon 6 and 1.1314 grams/cc for nylon 66. The polymer is melted and spun using spinnerets. Nylon 6 melts at a temperature of 215° C. while nylon 66 melts at a temperature of 264° C. These fibers can be cut to desired lengths, typically 1 to 5 cm in length and kinked using slotted rotating disk through which chopped fibers are passed through. The kinked fibers are assembled by air laying in a preform that has the length and width dimension of the desired sheet, and the thickness of the nylon is calculated according the density of the yarn and the desired thickness of the sheet. The sheet, which is loosely packed with fibers, is compressed by the application of pressure using a plate. The sheet now has a desired sheet thickness and has desired density.

This invention provides a molding process for producing rigid polymer porous low-density nylon based sheet material, or composite sheet. Chopped nylon fibers are produced from melt spun nylon yarns that are chopped or clean recycled nylon carpets by shearing the carpet pile. These chopped fibers are straight and are assembled to form a low-density fiber package. The fibers are fed to a slotted rotating disk that kinks the fibers as they pass through the slotted portion of the disk. Consequently, the kinked fibers do not lay on adjacent fibers; but, instead, form a loose packing density. The kinked fibers are fed by an air-laying method to an oversized mold, which has length and width as the desired sheet to be produced and has a height about two times the desired thickness of the nylon sheet. It is important to feed only the required amount of fibers into the mold, based on the thickness of nylon sheet desired, the density of nylon fiber, and the degree of porosity desired in the final nylon sheet. The thickness of the nylon assembly in the mold will be about twice that of the desired thickness of the nylon sheet, since the kinked fibers do not lie flat. A sheet metal is used to compress the kinked nylon fiber package in the mold to bring the thickness of the fiber preform to the desired thickness of the nylon sheet. The nylon fibers in the fiber preform are only loosely packed with adjacent fibers touching each other. An adhesive is needed to bond the nylon fibers.

The first adhesive chosen is glycol. Glycol is inert and does not attack or dissolve nylon fibers at low temperature. However, at high temperature of 180° C., the nylon is dissolved from the surface of the fibers. The amount of dissolution is a function of how long glycol contacts the nylon fibers. If this contact time is reduced to below 15 minutes, only a small amount of nylon is dissolved. The dissolved nylon by glycol forms a gel that has dissolved nylon and other dissolved decomposition products. The gels formed on adjacent fibers may contact each other.

The fiber preform is immersed in a glycol aqueous solution and temperature is increased to 180° C. Water in the solution evaporates and glycol reacts with nylon fibers, forming a gel when the contact time is below 15 minutes. The gels formed on adjacent fibers contact each other. Next, the temperature is reduced to 150° C. and held at that temperature for about 10 to 40 minutes. At this temperature, nylon is insoluble in glycol and precipitates dissolved nylon in the form of ultrafine nylon particles. The ultrafine nature of nylon particles have very large surface area and create a bond by surface diffusion. Next, the temperature is increased to 160° C. to allow the ultrafine nylon particles to create a bond between the fibers. The bonding time at 160° C. is less than 15 minutes.

Next, the bonded nylon sheet is cooled and washed with water at about 50° C. to 80° C. to dissolve unreacted glycol. The sheet is now rigid and porous with desired sheet thickness and sheet density.

The second adhesive for bonding the kinked nylon fibers in the fiber preform is polyurethane. A coupling agent is needed to allow bonding of polyurethane adhesive to nylon fibers. The first coupling agent is resorcinol aqueous solution. The amount of resorcinol present in the aqueous solution ranges from about 5 to 30 weight percent. The hydroxyl bonds of resorcinol attach to the nylon surface. Next, the coated fibers are immersed in a solution of vinyl pyrrolidone. The double coated nylon fibers are then sprayed with polyurethane. The fiber assembly is heated to 180° C., enabling bonding between nylon and resorcinol, resorcinol and vinyl pyrrolidone and between vinyl pyrrolidone and polyurethane. Upon cooling, the porous nylon sheet is rigid and is resistant to water and many chemicals. This rigid sheet can be pulled or drawn into strands for use in clothing, parachutes, rope and the like.

While nylon fibers have a very smooth, non-bonding surface, they can be bonded to materials such as rubber by means of a coupling agent to increase flexibility of the end product. A preferred coupling agent for this purpose is resorcinol formaldehyde, which is soluble in water. The assembled heat treated kinked nylon, having both open cell and closed cells after being heated to 180° C., is soaked in the coupling agent and then soaked in rubber latex. The latex fills the open cells with rubber, which is then treated by heating at 120 to 180° C. under pressure to cure the latex rubber. In accordance with this process, the closed cells are not filled with latex, and function as air bubble cushions. The resultant product has excellent insulation and flexibility characteristics, and is especially well suited for use as products that undergo stress in an environment influenced by heat and moisture.

The rigid nylon porous sheet can be used as a replacement for wooden board, thus reducing deforestation, and protecting the environment. At the same time, it is waterproof, moisture proof, soundproof, vibration absorbing, resistant to acid and alkali, resistant to climate aging, anti-flaming and fireproof. In these aspects, the rigid nylon sheet is superior to all other building materials.

Different kinds of materials are added into the rigid nylon sheet for different purposes:
1. For use in construction as a building material and in wall, floor and ceiling assembly tiles, as well as home decoration and furniture application, large amounts of plant fibers (such as wood chips, husks of rice, etc.) are added, to increase the hardness and nail holding ability;
2. For applications in cars, yachts, ships, aircrafts, and trains, and applications as embossing materials, thermal preservation materials, nitrile butadiene rubber (NBR) is added to greatly improve its performance of shaping, toughness, and impact resistance, and make it much easier for hot pressing, embossing, bending and carving;
3. A smoke suppressant, calcium silicate powder, and flame retardant are added to increase the sheet's fireproof and impact resistance properties, to reduce the density of smoke in flame environments, and to make it more eco-friendly.
4. This rigid nylon porous sheet constitutes an entirely new formaldehyde free, eco-green, flame resistant and thermal insulation building material.

Features and Usages of Rigid Nylon Sheet
1. Due to its lightweight, range of flexibility, hard body, and easy installation, the rigid nylon sheet of this invention is especially suited for a wide range of applications in the transportation industry, such as the roofs, bodies, and core layers of ships, aircraft, cars, and trains. Many kinds of materials can be easily adhered to the surface of the rigid nylon sheet described herein.
2. Due to its excellent thermal insulation, fire resistance and self-extinguishing characteristics, the nylon sheet of this invention can be used as fireproof doors, lumber, sheathing board, flooring and furniture for home usages, and in commercial buildings, hotels, and other public areas. It can also be used in framing structures and as the main body of architectural buildings and temples.
3. Due to its waterproof and moisture-proof characteristics, the sheet can be made into kitchen cabinets and bathroom decoration materials. It is also a good choice for outdoor projects, waterfront facilities, road and bridge projects, and templates for construction projects.
4. Due to its anti-corrosion and termite-proof performance characteristics, it is a good choice for industrial anti-corrosion projects, and architectural building repair projects. It is also a good choice as flooring or subflooring, siding, wall assembly systems, and roof for home usages due to its high R-value and waterproof characteristics.
5. Inasmuch as the nylon sheet's surface can precede spray treatment, and due to its very low thermal transfer and good thermal preservation, it can be used in freezers, and as the internal and external walls for hotels, and other buildings.
6. Due to the nylon sheet's excellent insulating and flexibility properties, it can be used as the bodies of electrical appliances, bodies of outdoor transformers, and circuit insulation boards, and the like.
7. The rigid nylon sheet is created by hot pressing first followed by cold pressing, and it is well suited for carving; thus is suited for use in decoration boards, advertising boards, and furniture.

FIG. 1 illustrates generally at 100 the process steps involved in the creation of the rigid nylon sheet. The nylon fibers at 101a are cut from a melt spun nylon yarn with cut lengths ranging from 1 to 5 inches. Nylon fibers may also be harvested from clean used nylon carpets by a shearing action as indicated in step 101b. These fibers are generally straight and when laid in an air stream do not form a porous fiber assembly. Consequently, the fibers are passed through a slotted rotating disk, as shown in step 102. A mold is produced at step 103 with length and width equal the dimension of the sheet desired but the height of the mold is twice the thickness of the desired nylon sheet. The amount of the kinked fibers needed to fill the mold is calculated at step 104 taking into account the degree of porosity desired in the nylon sheet and kinked fibers are air laid in the mold. Since the fibers are packed loosely due to kinks in the fibers, they need to be compressed by a compression sheet as shown at step 105 to the desired sheet thickness. The fibers become kinked and when air laid they assemble in a loose fiber packing. At step 106 the compressed preform is removed from the mold and immersed in an adhesive solution until all the fibers are coated and excess adhesive is drained. The adhesive coated compressed preform is transferred to a heating station that is set at cure temperature for the adhesive and is cured for required time to cure the adhesive. The bonded nylon sheet is removed in step 108 and cooled.

Figure 2:
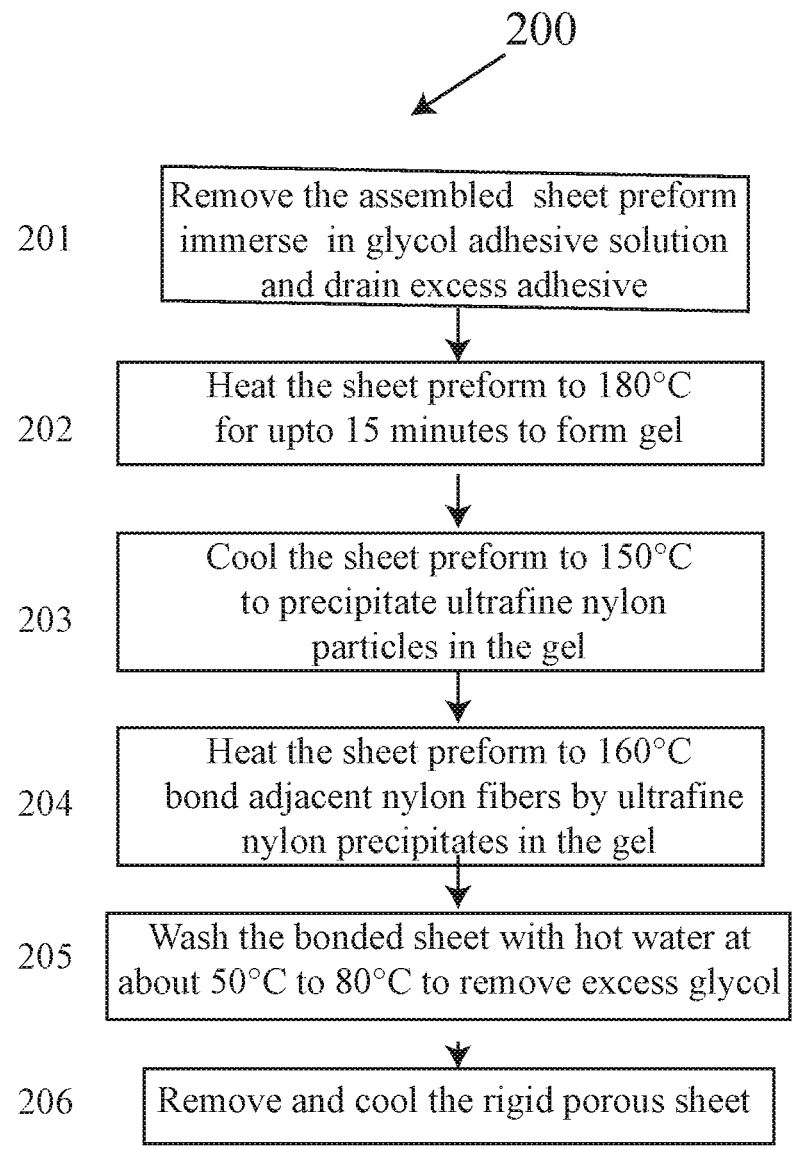
FIG. 2 illustrates use of glycol adhesive.

FIG. 2 illustrates generally at 200 the steps involved in using glycol adhesive. At step 201, the assembled sheet preform is removed from the mold. It is then immersed in a solution of glycol adhesive, which may be an aqueous solution since glycol is soluble in water. Excess adhesive is drained. At step 202, the adhesive soaked fiber preform is heated to 180° C. for up to 15 minutes to allow the glycol to react with nylon fiber surface. This reaction produces a gel, which includes dissolved nylon and other decomposition products. Next at step 203, the adhesive coated fiber perform with gel covering the fibers is cooled to 150° C. At 150° C. nylon is no longer attacked by glycol and dissolved nylon in the gel precipitates as ultrafine particles of nylon with very large surface area. At step 206, the sheet preform is heated to 160° C. to bond adjacent fibers by the ultrafine nylon precipitates in the gel with very large surface area by surface diffusion and other operating functions. At step 206, the bonded fiber preform is cooled and washed with 50° C. to 80° C. hot water dissolving unreacted excess glycol. At step 206, the bonded rigid porous nylon sheet is removed.

FIG. 3 illustrates generally at 300 steps involved in using polyurethane as the adhesive for bonding nylon fibers. At step 301, the assembled sheet preform is immersed in resorcinol solution. Excess resorcinol solution is drained. Since nylon fibers have a very smooth surface, most adhesives do not bond to the nylon fibers. A coupling agent is needed to bond nylon fibers to polyurethane. The first coupling agent is resorcinol, which is soluble in water and has two hydroxyl groups at each end. The hydroxyl group at the first end attaches to the hydrogen bonds on the nylon fibers. Resorcinol dissolves nylon on the surface of the fibers etching it. At step 302, the resorcinol dipped fiber preform is immersed in vinyl pyrrolidone solution. The hydroxyl group on the second end of resorcinol couples with vinyl pyrrolidone, creating a bond. At step 303 the double coated nylon preform is heated to 180° C. for up to 15 minutes creating a bond between nylon fibers, resorcinol and vinyl pyrrolidone. At 304, the double bonded cured preform is sprayed with aqueous polyurethane. The polyurethane coated nylon fiber preform is heated to 180° C. At step 305, the porous rigid nylon sheet is removed and cooled.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A method for manufacturing a rigid low-density nylon porous material sheet, comprising the steps of:
   a) utilizing melt-spun nylon fibers or nylon fibers harvested from recycled materials, the nylon fibers being chopped to lengths of 1 to 5 inches;
   b) passing the chopped nylon fibers through a slotted rotating disk to form kinks in the fibers;
   c) creating a mold which has the same length and width as the desired nylon sheet size but has a mold height at least twice that of the thickness of the desired nylon sheet;
   d) calculating the weight of the kinked fibers needed to fill the mold and produce a desired sheet thickness and sheet porosity;
   e) filling the mold with the calculated weight of kinked fibers and compressing the filled mold by application of pressure using a plate to bring the thickness of the sheet to the desired value and form an assembled fiber sheet preform;
   f) removing the adhesive treated assembled fiber sheet preform from the mold;
   g) immersing the assembled fiber sheet preform in an adhesive solution and draining excessive adhesive;
   h) heating said adhesive treated assembled fiber sheet preform to a temperature at 180° C. for sufficient time period to cure the adhesive, thereby bonding the nylon fibers;
   i) removing the rigid porous nylon sheet and cooling the nylon sheet; whereby the rigid porous the nylon sheet has closed air cells imparting the sheet with thermal resistance and sound attenuation properties, so that the sheet may be used in building construction as well as decorative applications.

2. The method for manufacturing the rigid low-density nylon porous material sheet as recited by claim 1, wherein said adhesive is glycol.

3. The method for manufacturing the rigid low-density nylon porous material sheet as recited by claim 1, wherein said adhesive is a combination of resorcinol solution and vinyl pyrrolidone coupling agents sprayed with polyurethane.

4. The method for manufacturing the rigid low-density nylon porous material sheet as recited by claim 2 including the steps of:
   a) removing the assembled fiber sheet preform from the mold;
   b) immersing the preform in an aqueous solution of glycol adhesive and draining excessive adhesive;
   c) heating the glycol adhesive-coated fiber sheet preform to 180° C. for 15 minutes, forming gel on the surface of the fibers in the fiber sheet preform;
   d) cooling the adhesive coated preform to 150° C. to precipitate ultrafine nylon particles within the gel formed on the fibers surfaces;
   e) reheating the adhesive coated preform to 160° C. to bond contacting fibers, and thereby producing bonds between the fibers; and
   f) washing the bonded adhesive coated preform in hot water at 50° C. to 80° C.

5. The method for manufacturing the rigid low-density nylon porous material sheet as recited by claim 3, including the steps of:
   a) removing the assembled fiber sheet preform from the mold;
   b) immersing the assembled fiber sheet preform in an aqueous solution of resorcinol coupling agent and draining excessive solution;
   c) immersing the assembled fiber sheet preform in an aqueous solution of vinyl pyrrolidone coupling agent and draining excessive solution;
   d) heating the coupling agent coated assembled fiber sheet preform to 180° C. for up to 15 minutes to bond nylon fibers in the fiber sheet preform to the coupling agents;
   e) heating the glycol adhesive-coated fiber sheet preform to 180° C. for 15 minutes to form gel on the surface of the fibers in the fiber sheet preform;
   f) cooling the adhesive coated preform to 150° C. to precipitate ultrafine nylon particles within the gel formed on the fibers surfaces;
   g) spraying the fiber sheet preform with aqueous polyurethane;
   h) heating the adhesive coated preform to 180° C. to bond the fibers; and
   i) cooling the bonded adhesive coated nylon sheet.

6. The method for manufacturing the rigid low-density nylon porous material sheet as recited by claim 1, wherein said recycled materials comprise articles of clothing.

7. The method for manufacturing the rigid low-density nylon porous material sheet as recited by claim 1, wherein said recycled materials comprise clean nylon carpet.

8. The method for manufacturing the rigid low-density nylon porous material sheet as recited by claim 1, wherein said recycled materials comprise a nylon-containing fabric.

9. The method for manufacturing the rigid low-density nylon porous material sheet as recited by claim 1, wherein said recycled materials comprise a nylon-containing rope.

* * * * *